Dec. 2, 1924.
H. O. WILKINSON
PLOW
Filed April 18, 1922      2 Sheets-Sheet 1
1,518,036
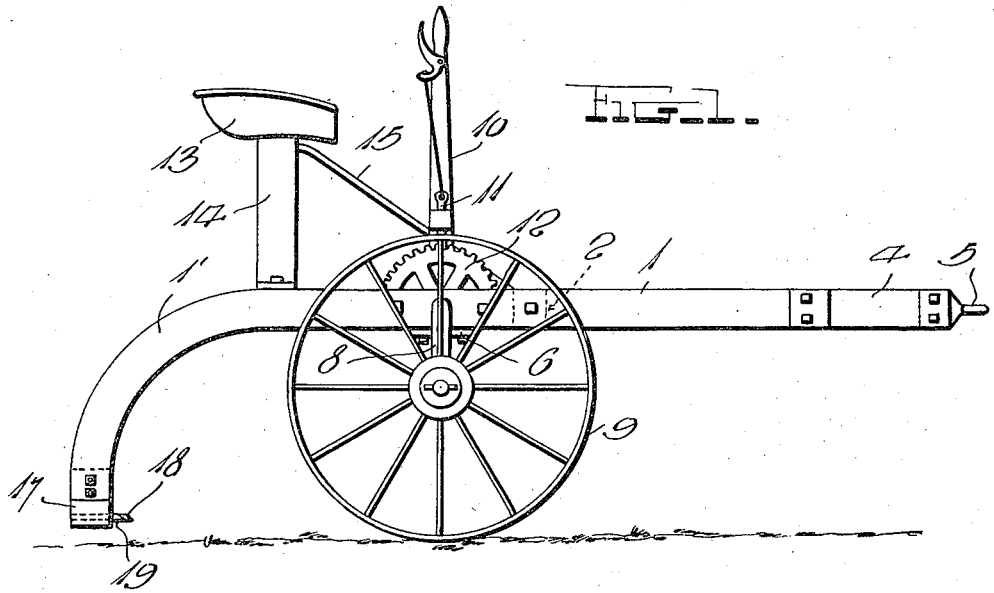
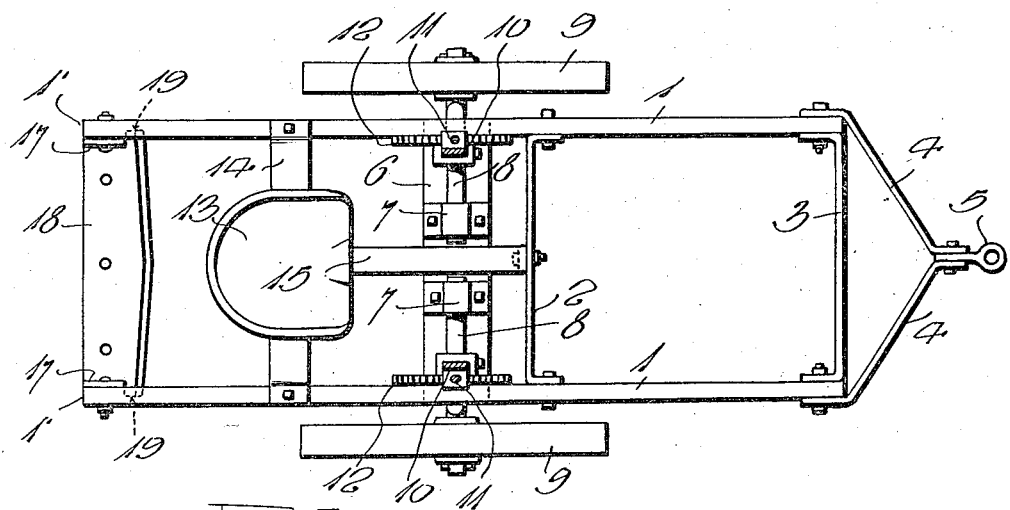
Witness
H. Woodard
Inventor
H. O. WILKINSON
By H. B. Willson & Co.
Attorneys Dec. 2, 1924.
H. O. WILKINSON
PLOW
Filed April 18, 1922    2 Sheets-Sheet 2
1,518,036
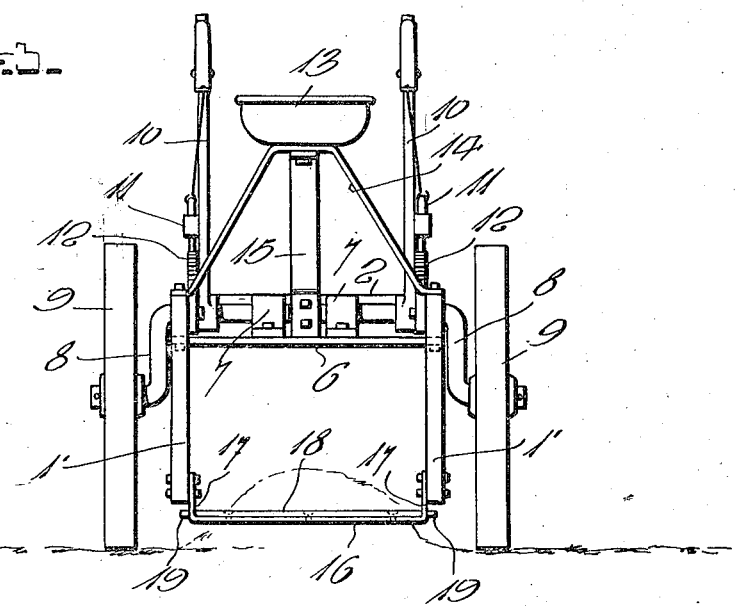
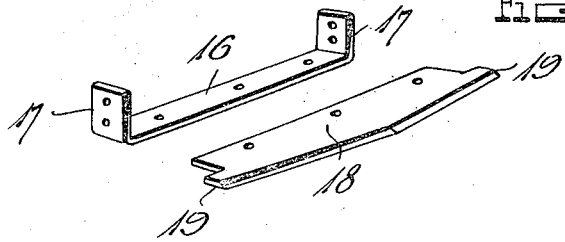
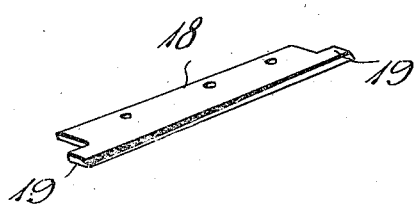
Witness
H. Woodard
Inventor
H. O. WILKINSON
By H. B. Wilson &c.
Attorneys Patented Dec. 2, 1924.

1,518,036

UNITED STATES PATENT OFFICE.

HOWARD O. WILKINSON, OF KINGFISHER, OKLAHOMA.

PLOW.

Application filed April 18, 1922. Serial No. 554,453.

*To all whom it may concern:*

Be it known that I, HOWARD O. WILKINSON, a citizen of the United States, residing at Kingfisher, in the county of Kingfisher and State of Oklahoma, have invented certain new and useful Improvements in Plows; and I do declare the following to be a full, clear, and exact description of the invention, such as will enable others skilled in the art to which it appertains to make and use the same.

This invention relates to an improved plow which may be used for cutting weeds or may be used as a sub-soil plow and will be particularly used for cutting through hills which extend across a field.

One object of the invention is to provide a sub-soil plow having an improved type of cutting blade which is carried by a U-shaped frame attached to depending arms of the machine frame, the blade being so constructed that its end portions will extend beyond the ends of the blade carrying frame and thus serve to prevent weeds from accumulating against the upturned end portions of the blade carrying frame and depending end portions of the bars which carry this frame.

Another object of the invention is to provide a blade which is constructed so that it can be easily removed and sharpened or repaired and then replaced or a substitute blade put in place while the blade which has previously been used is being repaired or sharpened.

Another object of the invention is to so construct the frame of this agricultural machine that vertical adjustment will be permitted to cause the blade to extend into the ground the desired amount.

Another object of the invention is to so construct this frame that the two side portions thereof may be independently adjusted and thus the blade retained at the proper angle.

This invention is illustrated in the accompanying drawings, wherein:

Figure 1 is a view showing the improved plow in side elevation.

Figure 2 is a top plan view of the improved plow, the upper end portions of the adjusting levers being broken away.

Figure 3 is a view showing the improved plow in rear elevation.

Figure 4 is a perspective view of the blade carrier and a blade to be connected therewith.

Figure 5 is a perspective view of a slightly modified form of blade.

This agricultural machine which is a sub-soil plow of the riding type is provided with a frame having side bars 1 connected by bracing bars 2 and 3 and having their forward end portions provided with arms 4 which extend forwardly and are connected with a clevis 5 so that a draft appliance may be connected with the frame. The side bar carries a plate 6 which extends between them intermediate the length of the frame and carries bearings 7 so that the stub-axles 8 which extend through openings in the side bars 1 may be rotatably mounted. These stub-axles 8 have their outer end portions extending downwardly and provided with outwardly disposed spindle extensions upon which the wheels 9 are rotatably mounted. Latch levers 10 are carried by the stub-axles and have their pawls 11 engaging racks 12 so that the axles may be independently turned to vertically adjust the frame and then secured in the set position by engagement of the pawls of these levers with the racks 12. By having the axle made in two sections instead of as a single axle, opposite side portions of the frame of this machine can be independently adjusted and thus the digging blade of the machine can be properly adjusted for cutting into the ground the desired amount and further can be placed at a desired incline or held horizontally.

To the rear of the driver's seat 13 which is carried by a support 14 and braced by a forwardly extending bracing bar 15, the side arms 1 are curved downwardly thus providing depending rear end portions 1' with which will be secured the blade carrier. This blade carrier 16 is in the form of a bar having its end portions bent to extend upwardly to provide arms 17 secured to the depending rear end portions of the side bars 1 by bolts or other similar fasteners. The blade 18 is secured to the carrier bar 16 by removable fasteners which pass through openings formed in the blade and carrier bar and this blade is cut to provide extended end portions 19 which will extend in front of the arms 17 and depending end portions 1' of the side bars 1. By having the end portions of the cutting blade extending across the arms of the blade carrier, weeds and the like will be prevented from catching against the arms of the carrier. It has been found that when a U-shaped cutting blade is made use of in connection with sub-soilers that grass, weeds and the like will tend to accumulate against the upturned arms of a blade of this type and this not only interferes with the proper cutting of the blade but further will sometimes tend to cause one side portion of the blade to be lifted from the ground. With this structure, accumulation of the grass and weeds will be prevented and interference with proper operation will be eliminated. It has been further found that with a U-shaped blade, it is difficut to resharpen it as the end portions cannot be properly sharpened, whereas with this device the cutting edge is straight throughout its length and the blade can be easily sharpened. The cutting edge may be straight throughout its length as shown in Fig. 5 or this cutting blade may have its cutting edge sloping rearwardly from a point intermediate the width of the blade as shown in Fig. 4. There has thus been provided a sub-soil plow which will be very efficient in operation and can be used either for cutting weeds or for passing through a hill with the wheels 9 upon opposite sides of the hill and the frame portion of the machine straddling the hill.

I claim:

In a subsoil plow a frame comprising parallel longitudinal side bars curved downwardly at their rear ends, a blade carrying bar having its ends bent upwardly at right angles, said ends being bolted to said downwardly curved ends of the side bars of the frame and a blade bolted to said bar, said blade having its ends notched out to fit closely between the upwardly bent ends of the carrying bar and to provide extensions on the ends of the front portion of the blade which bear against the upwardly bent ends of the supporting bar and project laterally beyond said ends whereby weeds and the like are prevented from accumulating against the downwardly curved ends of the side bars of the plow frame.

In testimony whereof I have hereunto set my hand.

HOWARD O. WILKINSON.